United States Patent

[11] 3,590,284

[72] Inventor Masami Yamane
Tokyo, Japan
[21] Appl. No. 711,770
[22] Filed Mar. 8, 1968
[45] Patented June 29, 1971
[73] Assignee Hitachi, Ltd.
Tokyo, Japan
[32] Priority Mar. 10, 1967
[33] Japan
[31] 42/14711 and 42/14712

[54] FILTER CIRCUIT
8 Claims, 7 Drawing Figs.

[52] U.S. Cl. .......... 307/295, 328/165
[51] Int. Cl. .......... H03k 1/16
[50] Field of Search .......... 307/295; 328/165, 167, 138; 333/70

[56] References Cited

UNITED STATES PATENTS

| | | | |
|---|---|---|---|
| 3,322,970 | 5/1967 | Batteau .......... | 307/295 |
| 3,388,336 | 6/1968 | Mattern .......... | 333/70 UX |
| 3,426,291 | 2/1969 | Weglein et al. .......... | 328/165 X |
| 3,493,876 | 2/1970 | Zimmerman .......... | 328/167 |

*Primary Examiner*—Stanley T. Krawczewicz
*Attorney*—Craig, Antonelli, Stewart & Hill

ABSTRACT: A filter circuit comprising a low (or high)-pass filter having a third order transfer function and a phase shifter having a first order transfer function. An output of the phase shelter is subtracted (added) by a subtractor (adder) from (to) an output of the low (high)-pass filter, whereby a desired third order transfer function equivalent to that of a high (low)-pass filter is obtained as a transfer function between an input of the filter circuit and an output of the subtractor (adder).

INVENTOR
MASAMI YAMANE
BY Craig & Antonelli
ATTORNEYS

INVENTOR

MASAM[illegible] YAMA[illegible]

BY Craig & Antonelli

ATTORNEYS

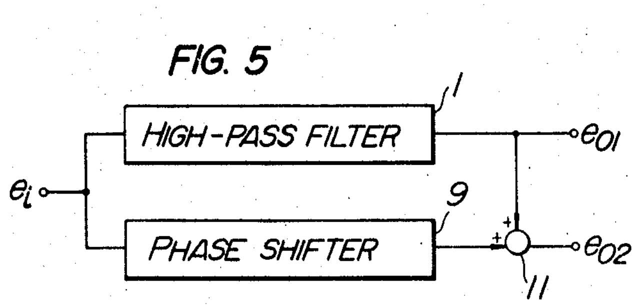
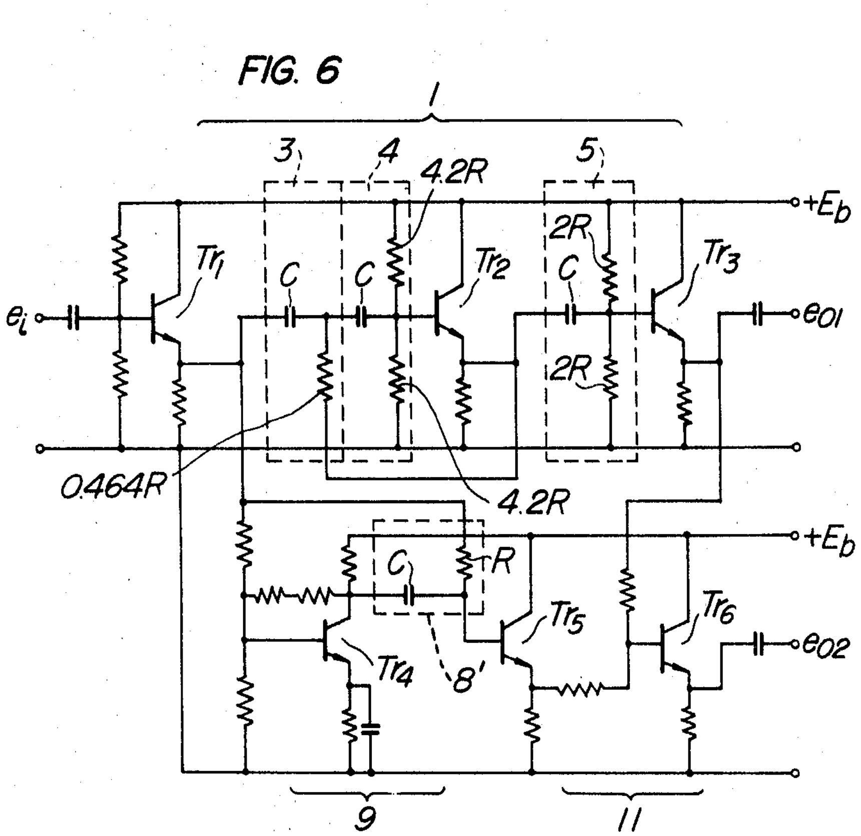
INVENTOR
MASAMI YAMANE
BY Craig & Antonelli
ATTORNEYS

INVENTOR

MASAMI YAMANE

BY Craig & Antonelli

ATTORNEYS

FILTER CIRCUIT

The present invention relates to a novel filter circuit for separating an input signal into an output signal in a frequency range higher than a desired frequency and an output signal in a frequency range lower than that frequency.

A conventional filter circuit is constituted by a combination of a high pass filter and a low-pass filter which have the same cutoff frequency and have, for example, third order transfer functions. Each of the gain-frequency characteristics of these filters is the flattest characteristic. The flattest characteristic is such a characteristic as is the flattest in a pass band up to the cutoff frequency and is the steepest in attenuation in a cutoff band. The flattest characteristic is the most desirable characteristic as the gain-frequency characteristic of a filter circuit.

To realize such a filter circuit as having a third order transfer function and the flattest characteristic, six sets of resistors and capacitors, for example, of high accuracy which determine the gain-frequency characteristic have conventionally been employed. Therefore, this circuit is complicated and expensive.

It is an object of the present invention to provide a filter circuit which dispenses with either one of the highpass filter and the low-pass filter and yet has the same flattest characteristic as that of a conventional filter circuit.

It is another object of the present invention to provide a simple and inexpensive filter circuit in which the number of the aforementioned sets of resistors and capacitors of high accuracy is reduced to four.

According to the present invention there is provided a filter circuit comprising a low-pass filter having a third order transfer function $$1/\left\{1+j\frac{\omega}{\omega_0}+\left(j\frac{\omega}{\omega_0}\right)^2\right\}\left(1+j\frac{\omega}{\omega_0}\right),$$

a phase shifter having a first order transfer function $$\left(1-j\frac{\omega}{\omega_0}\Big/1+j\frac{\omega}{\omega_0}\right),$$

means for applying an input signal to the low-pass filter and the phase shifter, and a subtractor circuit for subtracting an output of the phase shifter from an output of the low-pass filter.

According to the present invention there is also provided a filter circuit comprising a high pass filter having a third order transfer function $$\left(j\frac{\omega}{\omega_0}\right)^3\Big/\left\{1+j\frac{\omega}{\omega_0}+\left(j\frac{\omega}{\omega_0}\right)^2\right\}\left(1+j\frac{\omega}{\omega_0}\right),$$

a phase shifter having a first order transfer function $$\left(1-j\frac{\omega}{\omega_0}\Big/1+j\frac{\omega}{\omega_0}\right),$$

means for applying an input signal to the high pass filter and the phase shifter, and an adder circuit for adding an output of the high pass filter to an output of the phase shifter.

FIG. 5 is a block diagram of another embodiment of the filter circuit of the present invention;

FIG. 6 is a circuit diagram of the embodiment of FIG. 5; and

Figure 1:
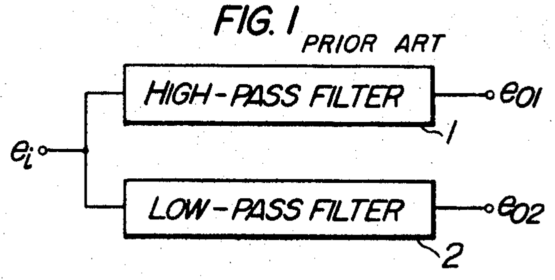
FIG. 1 PRIOR ART
FIG. 1 is a block diagram of a conventional filter circuit.

In FIG. 1 which shows a block diagram of a conventional filter circuit, the transfer function $G_1$ of a high pass filter 1 is $$G_1=\frac{\left(j\frac{\omega}{\omega_0}\right)^3}{\left\{1+j\frac{\omega}{\omega_0}+\left(j\frac{\omega}{\omega_0}\right)^2\right\}\left(1+j\frac{\omega}{\omega_0}\right)} \quad (1)$$

where $\omega=2\pi f$, $f$: frequency, $\omega_o=2\pi f_o$, $f_o$: cutoff frequency, $j=\sqrt{-1}$ The transfer function $G_2$ of a low-pass filter 2 is $$G_2=\frac{1}{\left\{1+j\frac{\omega}{\omega_0}+\left(j\frac{\omega}{\omega_0}\right)^2\right\}\left(1+j\frac{\omega}{\omega_0}\right)} \quad (2)$$

Figure 2:
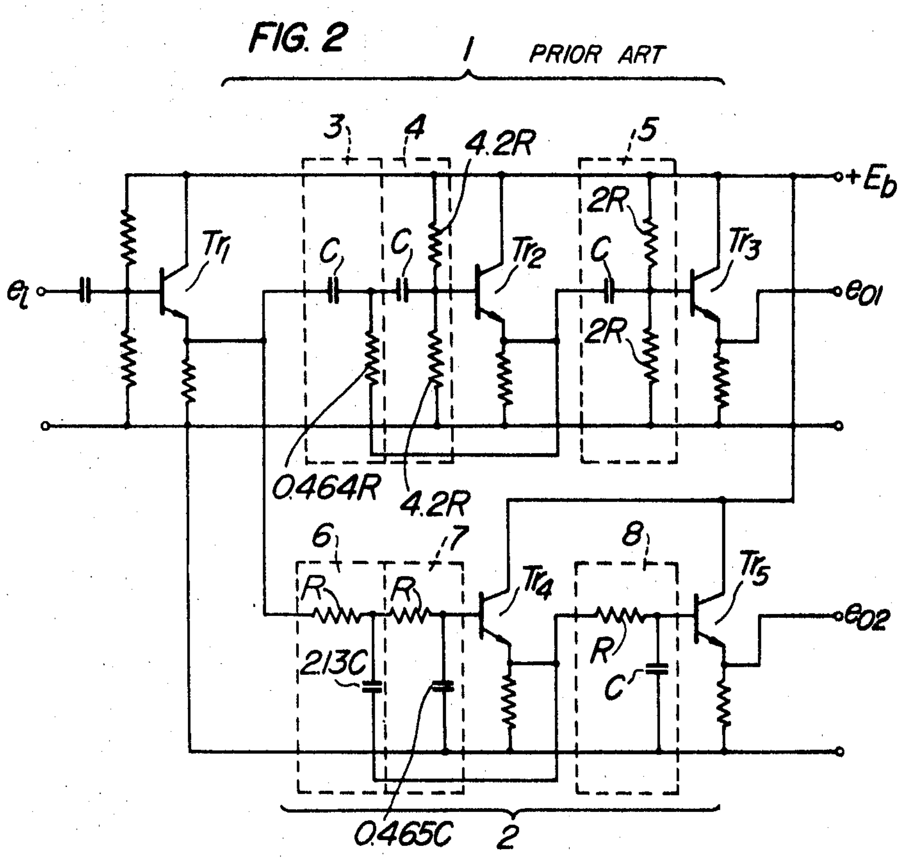
FIG. 2 is a circuit diagram of the filter circuit of FIG. 1.

FIG. 2 shows a circuit diagram of the conventional filter circuit shown in FIG. 1. This circuit employs six sets 3 to 8 of resistors R and capacitors C of high accuracy which determine the gain-frequency characteristic. In FIG. 2, each of the transistors Tr1 to Tr5 constitutes an emitter follower circuit. As is well known the gain of an emitter follower circuit is slightly less than 1. However, if it is assumed that the gain of an emitter follower circuit is equal to 1, the resistance values of 0.464R and 4.2R in the sets of resistor-capacitor networks 3, 4 and 5 are then assumed to be 0.5R and 4R, respectively, and capacitances 2.13C and 0.465C in the three sets of networks 6, 7 and 8 are taken to be 2C and 0.5C, respectively. The transfer function $F_1$ between the output of transistor Tr1 and the output of transistor Tr2 will then be defined as $$F_1=\frac{(j\omega CR)^2}{1+j\omega CR+(j\omega CR)^2}$$

On the other hand, the transfer function $F_2$ between the output of transistor Tr2 and the output of transistor Tr3 will be defined as $$F_2=\frac{j\omega CR}{1+j\omega CR}$$

As a result, the overall transfer function between input $e_i$ and output $e_{01}$ will then be defined as $$\frac{e_{01}}{e_i}=F_1F_2=\frac{\left(j\frac{\omega}{\omega_0}\right)^3}{\left\{1+j\frac{\omega}{\omega_0}+\left(j\frac{\omega}{\omega_0}\right)^2\right\}\left(1+j\frac{\omega}{\omega_0}\right)}$$

Therefore, by comparing the last equation with the equation 1, it can be seen that the three sets 3, 4 and 5 of resistor-capacitor networks and the pair of transistors Tr2 and Tr3 constitute high pass filter 1, where the cutoff frequency $\omega_o$ thereof is $\omega_o=1/CR$.

Likewise the transfer function $F_3$ between the output of transistor Tr1 and the output of transistor Tr4 is defined by $$F_3=\frac{1}{1+j\omega CR+(j\omega CR)^2}$$

while the transfer function $F_4$ between the output of transistor Tr4 and the output of transistor Tr5 is defined by $$F_4=\frac{1}{1+j\omega CR}$$

Thus, the transfer function between input $e_i$ and output $e02$ becomes $$\frac{e_{02}}{e_i}=F_3F_4=\frac{1}{\{1+j\omega CR+(j\omega CR)^2\}(1+j\omega CR}$$

It is evident, by a comparison between the above equation with the equation (2), that the three sets of resistor-capacitor networks 6, 7 and 8 and transistors Tr4 and Tr5 constitute low-pass filter 2. In the description immediately above, the values 0.464R, 4.2R, 2.13C, and 0.465C in the sets of networks 3, 4, 6 and 7 were assumed to be 0.5R, 4R, 2C and 0.5C, respectively. Again, these assumptions were made since the gains of the emitter followers were assumed to be 1.

In reality, since the gain of an emitter follower circuit is, in fact, slightly less than 1, the value of the gain-frequency characteristic of each of the filters 1 and 2 deviates slightly from the value calculated from equations (1) (2). Therefore, in order to minimize the deviation, the coefficients of the resistors and capacitors in the resistor-capacitor networks were experimentally determined to be those values as shown in FIG. 2.

Figure 3:
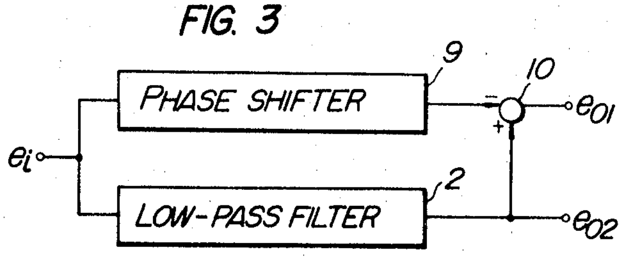
FIG. 3 is a block diagram of an embodiment of the filter circuit of the present invention.

Referring now to FIG. 3, which shows a block diagram of an embodiment of the present invention, if an input signal $e_i$ is fed to a common input terminal of a phase shifter 9 having a transfer function.

$$G_3=\frac{1-j\frac{\omega}{\omega_0}}{1+j\frac{\omega}{\omega_0}} \qquad (3)$$

and a low-pass filter 2, the transfer function $G_4$ between an output signal $e_{01}$ from a subtractor 10, which subtracts an output signal of the phase shifter 9 from an output signal of the low-pass filter 2, and the input signal $e_i$ is $$G_4=\frac{1}{\left\{1+j\frac{\omega}{\omega_0}+\left(j\frac{\omega}{\omega_0}\right)^2\right\}\left(1+j\frac{\omega}{\omega_0}\right)}-\frac{1-j\frac{\omega}{\omega_0}}{1+j\frac{\omega}{\omega_0}}$$

$$=\frac{\left(j\frac{\omega}{\omega_0}\right)^3}{\left\{1+j\frac{\omega}{\omega_0}+\left(j\frac{\omega}{\omega_0}\right)^2\right\}\left(1+j\frac{\omega}{\omega_0}\right)} \qquad (4)$$

Figure 4:
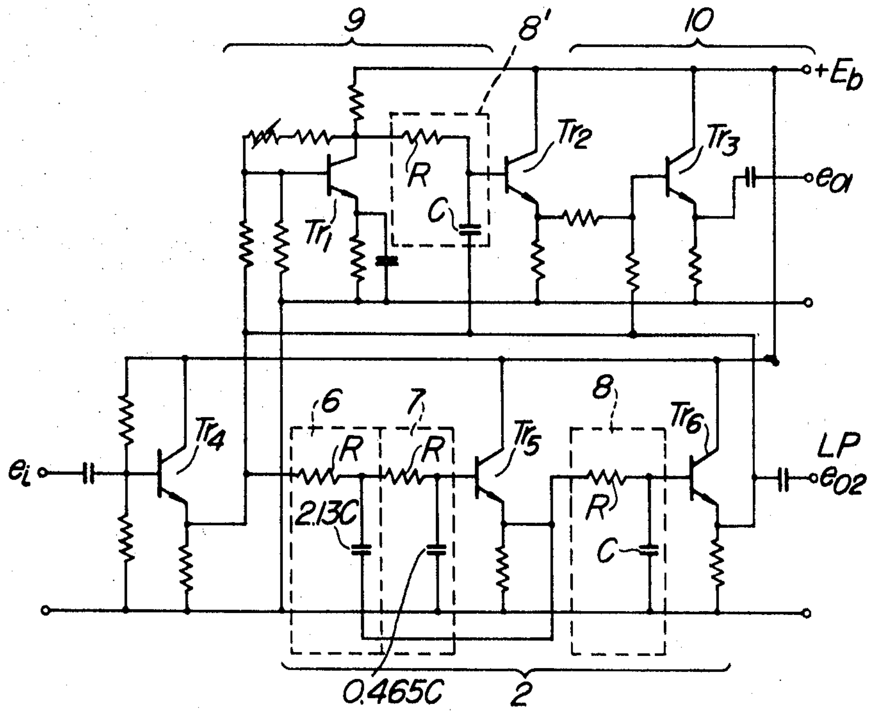
FIG. 4 is a circuit diagram of the embodiment of FIG. 3.

Thus, the transfer function $G_4$ is equivalent to the transfer function $G_1$ of the high pass filter 1 shown in FIG. 1. Therefore, by constructing such that the output signal $e_{01}$ of the subtractor 10 and an output signal $e_{02}$ of the low-pass filter 2 are derived separately, a desired filter circuit can be obtained. In this case, the phase shifter 9 can be composed of a set 8'' as shown in FIG. 4 a resistor R and a capacitor C. Consequently, a total of four sets of resistors and capacitors, one set for the phase shifter 9 and three sets for the low-pass filter 2, sufficiently serve to constitute the filter circuit. Thus, the filter circuit according to the present invention is simple in structure and inexpensive as compared with the conventional one.

FIG. 4 shows an example of the filter circuit constructed according to the principle of the present invention described with reference to FIG. 3. In FIG. 4, it is evident that the transfer function $e_{02}/e_i$ becomes the same as the transfer function of the low-pass filter 2 when the values 2.13C and 0.465C of the capacitors in resistor-capacitor networks 6 and 7 are assumed to be 2C and 0.5C, respectively and the gain of transistor Tr5 is assumed to be 1.

The transfer function $F_5$ between the output of transistor Tr4 and the input at the base of transistor Tr2 can be determined as follows.

In the equivalent circuit of transistor Tr1, the gain of which is assumed to be 1, and a resistor R and capacitor C connected to the output of transistor Tr1, the output $e$ of transistor Tr4 is applied to capacitor C and the inverted output "$-e$" of transistor Tr4 is applied to resistor R. Thus, the equivalent circuit forms a loop ($-e$)—R—C—$e$. Since the base of transistor Tr2 is connected to the junction point of resistor R and capacitor C, the following relationships are obtained:

$$e_0=e+i\frac{1}{j\omega C};\quad i=\frac{-Ze}{\frac{1}{j\omega C}+R}$$

where $i$ is the current flowing through the loop and $e_0$ is the voltage applied to the base of transistor Tr2.

Since the transfer function $F_5$ equals $e_0/e$, then $$F_5=\frac{-1+j\omega CR}{1+j\omega CR}=\frac{-\left(1-j\frac{\omega}{\omega_0}\right)}{1+j\frac{\omega}{\omega_0}}.$$

Thus, the transfer function $F_5$ is the same as that of phase shifter 9 (however, the polarities are inverted with respect to each other).

The outputs of transistors Tr2 and Tr6 are added at the input (base) of transistor Tr3, but the phases of the outputs are inverted with respect to each other. Therefore, transistor Tr3 functions as subtractor 10, and the transfer function $e_{01}/e_i$ thereof becomes the same as that of high pass filter 1.

Figure 7:
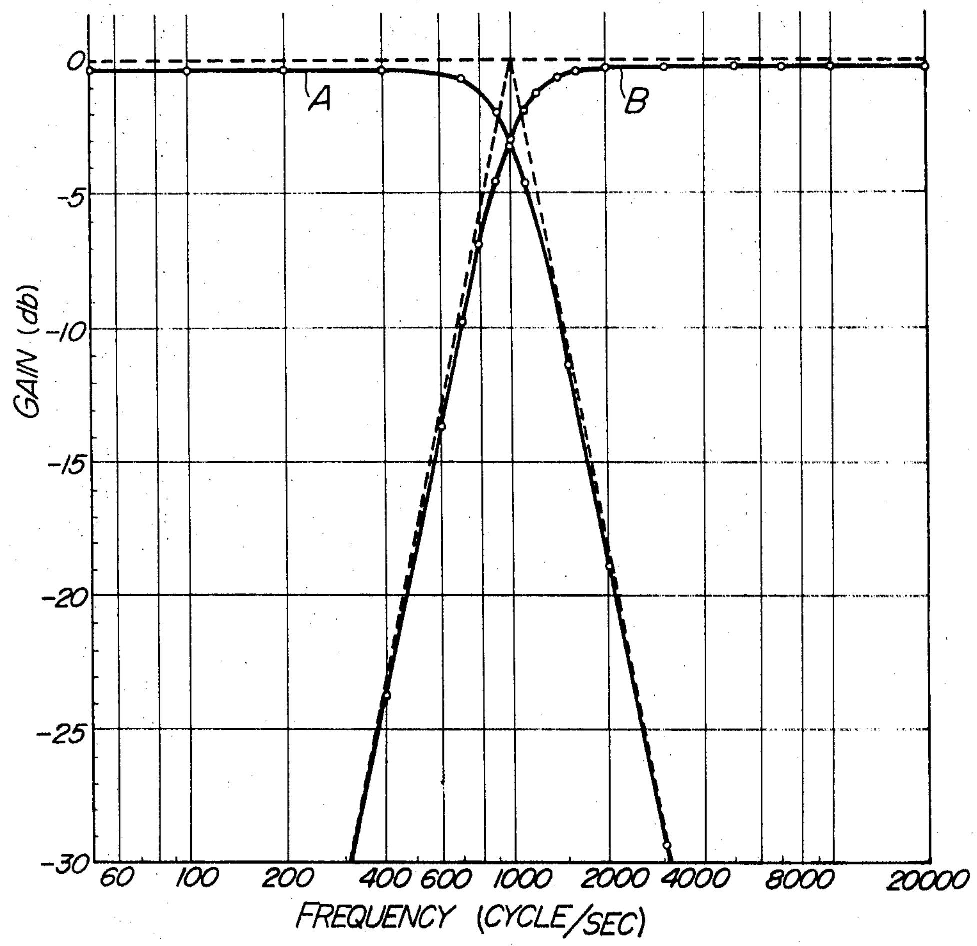
FIG. 7 is the gain-frequency characteristics of the filter circuits of FIGS. 4 and 6.

In this arrangement, the values of the capacitors in networks 6 and 7 are determined to be 2.13C and 0.465C rather than 2C and 0.5C, respectively as was done in a circuit of FIG. 2. The gain-frequency characteristic of the embodiment of FIG. 4 is the flattest characteristic as shown in FIG. 7 wherein a curve A shows the gain-frequency characteristic of the output $e_{02}$ of the low-pass filter 2 and a curve B shows the gain-frequency characteristic of the output $e_{01}$ of the subtractor 10.

FIG. 5 shows another embodiment of the present invention. Similarly to the embodiment of FIG. 3, if an input signal $e_i$ is fed to a common input terminal of a phase shifter 9 which is the same as that shown in FIG. 3 and a high pass filter 1, the transfer function $G_5$ between an output signal $e_{02}$ from an adder 11 which adds an output signal of the phase shifter 9 to an output signal of the high pass filter 1, and the input signal $e_i$ is $$G_5=\frac{\left(j\frac{\omega}{\omega_0}\right)^3}{\left\{1+j\frac{\omega}{\omega_0}+\left(j\frac{\omega}{\omega_0}\right)^2\right\}\left(1+j\frac{\omega}{\omega_0}\right)}+\frac{1-j\frac{\omega}{\omega_0}}{1+j\frac{\omega}{\omega_0}}$$

$$=\frac{1}{\left\{1+j\frac{\omega}{\omega_0}+\left(j\frac{\omega}{\omega_0}\right)^2\right\}\left(1+j\frac{\omega}{\omega_0}\right)} \qquad (5)$$

Thus, the transfer function $G_5$ is equivalent to the transfer function $G_2$ of the low-pass filter 2 shown in FIG. 1. Therefore, by constructing such that the output signal $e_{02}$ of the adder 11 and an output signal $e_{01}$ of the high pass filter 1 are derived separately, a desired filter circuit can be obtained. In this case also, the phase shifter 9 can be composed of a set of resistor R and capacitor C. Consequently, a total of four sets of 8'' as shown in FIG. 6 resistors and capacitors, one set for the phase shifter 9 and three sets for the high pass filter 1, sufficiently serve to constitute the filter circuit. The filter circuit thus constructed is also simple in structure and inexpensive as compared with the conventional one.

FIG. 6 shows an example of the filter circuit constructed according to the principle of the present invention described with reference to FIG. 5. In FIG. 6 it will be evident from the above description that the transfer function $e_{01}/e_i$ between input signal $e_i$ and output signal $e_{01}$ is the same as that of high pass filter 1. Transfer function F6 between the output of transistor Tr1 and the input (base) of transistor Tr5 is determined in a manner similar to the case of FIG. 4. Thus, $$F_6=\frac{1-j\frac{\omega}{\omega_0}}{1+j\frac{\omega}{\omega_0}}$$

The outputs of transistors Tr3 and Tr5 are added at the input (base) of transistor Tr6. Since these outputs are in phase, as is evident when comparing the transfer function $F_6$ with transfer function $F_5$, the transistor Tr6 functions as an adder 11 and transfer function $e_{02}/e_i$ becomes equivalent to the transfer function of low-pass filter 2. The values of the resistors in networks 3 and 4 are determined to be 0.464R and 4.2R as was done in the case of the circuit shown in FIG. 2. The gain-frequency characteristic of the embodiment of FIG. 6 is the same flattest characteristic as that shown in FIG. 7.

I claim:

1. A filter circuit comprising: a low-pass filter having a third order transfer function $$1\Big/\left\{1+j\frac{\omega}{\omega_0}+\left(j\frac{\omega}{\omega_0}\right)^2\right\}\left(1+j\frac{\omega}{\omega_0}\right)$$

a phase shifter having a first order transfer function $$1-j\frac{\omega}{\omega_0}/1+j\frac{\omega}{\omega_0}$$

means for applying an input signal to said low-pass filter and said phase shifter, and a subtractor circuit for subtracting an output of said phase shifter from an output of said low-pass filter.

2. Filter circuit comprising: a high pass filter having a third order transfer function $$\left(j\frac{\omega}{\omega_0}\right)^3\Big\backslash\left\{1+j\frac{\omega}{\omega_0}+\left(j\frac{\omega}{\omega_0}\right)^2\right\}\left(1+j\frac{\omega}{\omega_0}\right)$$

a phase shifter having a first order transfer function $$1-j\frac{\omega}{\omega_0}\Big/1+j\frac{\omega}{\omega_0}$$

means for applying an input signal to said high pass filter and said phase shifter, and an adder circuit for adding an output of said high pass filter to an output of said phase shifter.

3. A filter circuit comprising:

a phase shifter having a first order transfer function, a filter which substantially attenuates a portion of the frequency spectrum and is defined by a third order transfer function, means for applying an input signal to said filter and said phase-shifter and means for combining the outputs of said phase-shifter said filter, wherein said filter is a high pass filter whose transfer function is represented by $$\left(j\frac{\omega}{\omega_0}\right)^3\Big/\left[1+j\frac{\omega}{\omega_0}+\left(j\frac{\omega}{\omega_0}\right)^2\right]\left(1+j\frac{\omega}{\omega_0}\right)$$

and wherein said combining means is a means for adding the output of said phase-shifter to the output of said high pass filter, whereby the gain-frequency characteristic of said filter is substantially flattened.

4. A filter circuit comprising: a phase shifter having a first order transfer function, a filter which substantially attenuates a portion of the frequency spectrum and is defined by a third order transfer function, means for applying an input signal to said filter and said phase-shifter and means for combining the outputs of said phase-shifter and said filter, wherein said filter is a low-pass filter whose transfer function is represented by $$1\Big/\left[1+j\frac{\omega}{\omega_0}+\left(j\frac{\omega}{\omega_0}\right)^2\right]\left(1+j\frac{\omega}{\omega_0}\right)$$

and wherein said combining means is a means for subtracting the output of said phase-shifter from the output of said low-pass filter, whereby the gain-frequency characteristic of said filter is substantially flattened.

5. A filter circuit according to claim 3, wherein said phase-shifter comprises a resistance-capacitance network and wherein said adding means comprises a first emitter follower circuit, one of the inputs of which is connected to said resistance-capacitance network, whereby the first order of transfer function of said phase-shifter is defined by $$1-j\frac{\omega}{\omega_0}\Big/1+j\frac{\omega}{\omega_0}$$

6. A filter circuit according to claim 5, wherein said high pass filter comprises a plurality of resistance-capacitance networks, each connected in series with respect to the emitter follower circuits so as to define said third order transfer function and wherein said adding means comprises a second emitter follower circuit the input of which is connected to the output of said first emitter follower circuit and to the output of said high pass filter.

7. A filter circuit according to claim 4, wherein said phase-shifter comprises a resistance-capacitance network and wherein said subtracting means comprises a third emitter follower circuit one of the outputs of which is connected to said resistance-capacitance network, whereby said first order transfer function of said phase-shifter is defined by $$1-j\frac{\omega}{\omega_0}\Big/1+j\frac{\omega}{\omega_0}$$

8. A filter circuit according to claim 7, wherein said low-pass filter comprises a plurality of resistance-capacitor networks each connected in series with respect to the emitter follower circuits so as to define said third order transfer function and wherein said subtracting means comprises a fourth emitter follower circuit the input of which is connected to the output of said third emitter follower circuit and to the output of said low-pass filter.